Nov. 8, 1932.  J. WYSS  1,886,928
APPARATUS FOR PRODUCING LAMINATED SHEETS
Filed March 26, 1930   2 Sheets-Sheet 2
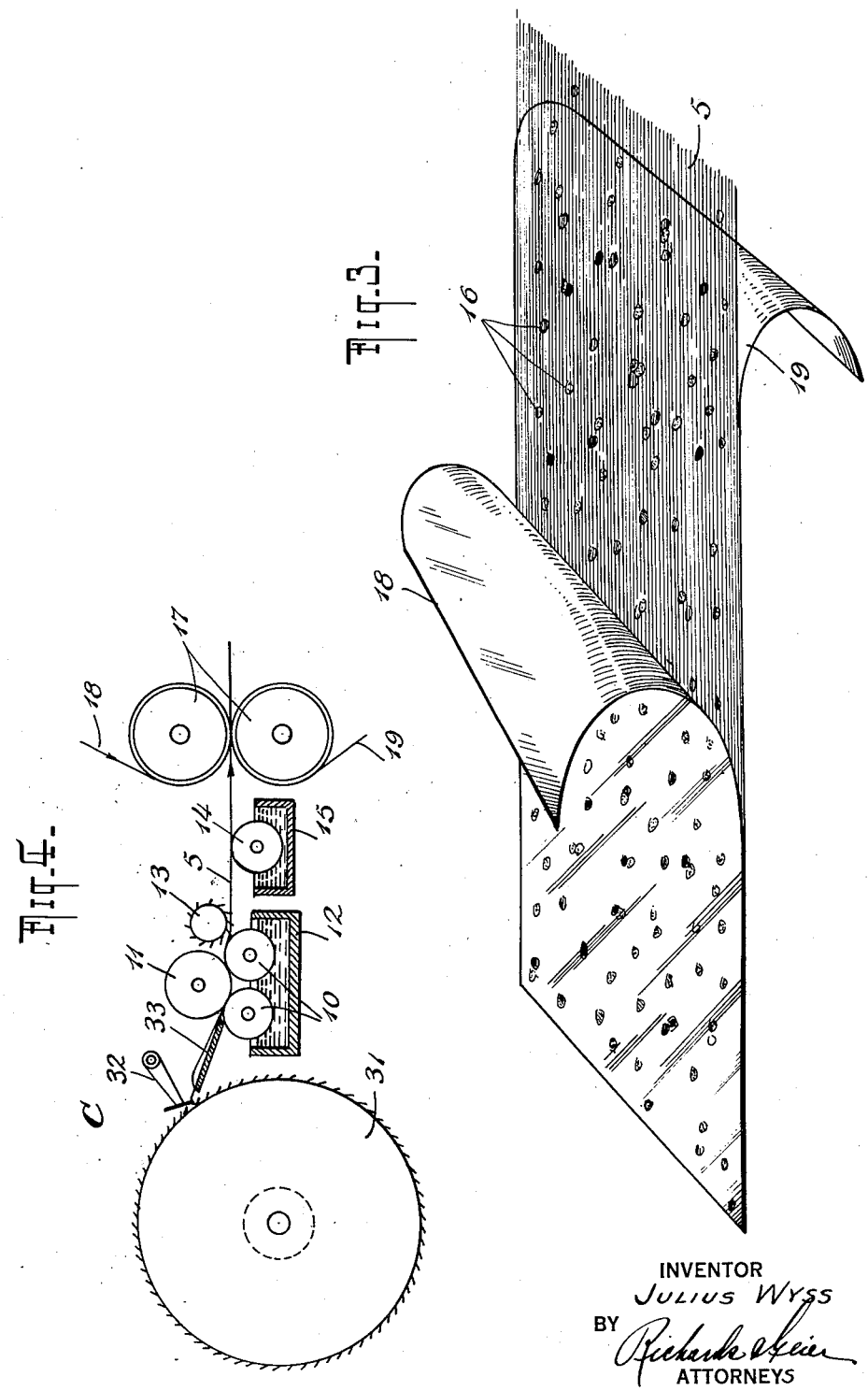
INVENTOR
JULIUS WYSS
BY
ATTORNEYS Patented Nov. 8, 1932

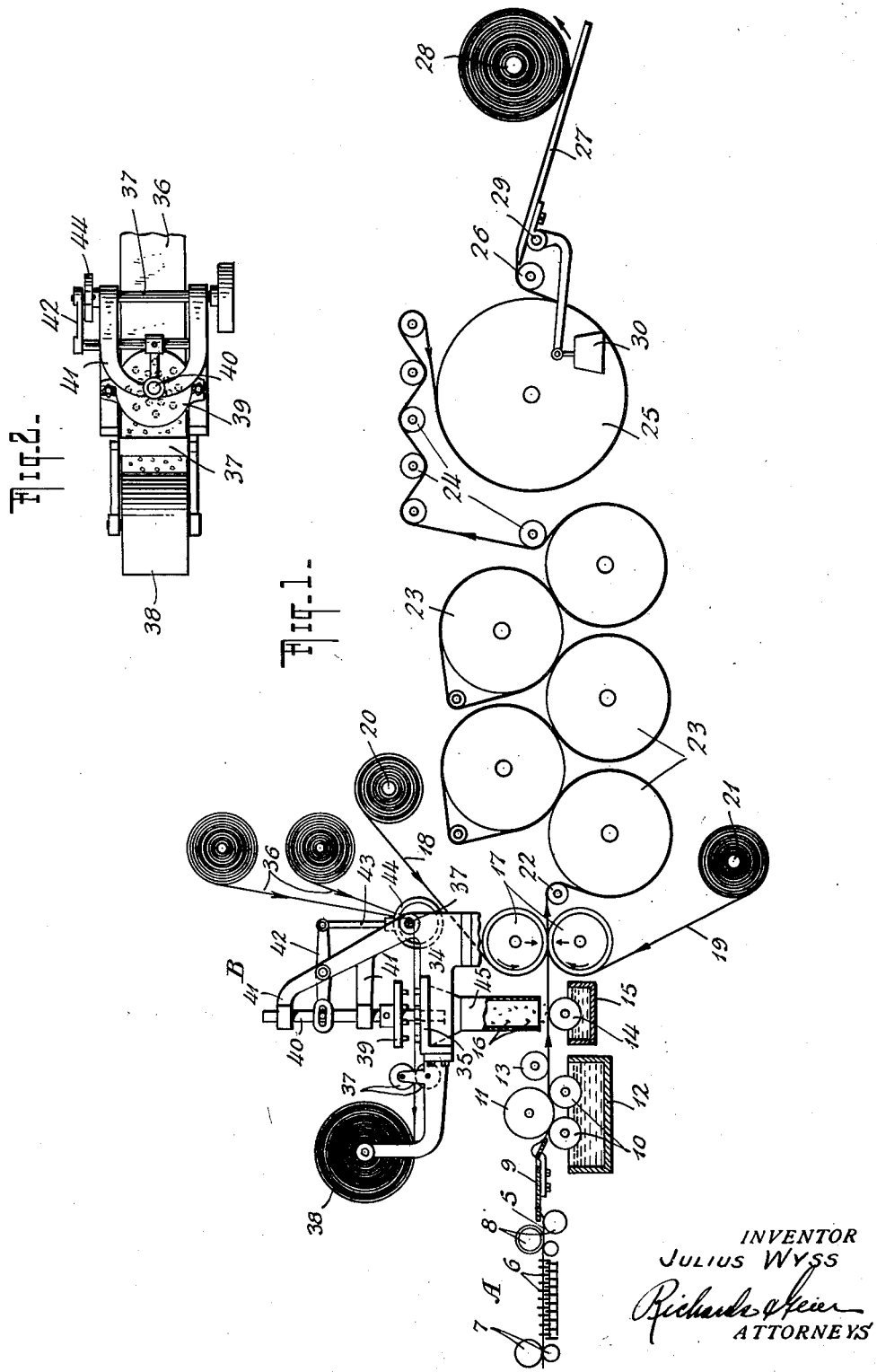

1,886,928

UNITED STATES PATENT OFFICE

JULIUS WYSS, OF WATERTOWN, MASSACHUSETTS, ASSIGNOR TO NEW ENGLAND SPUN SILK CORPORATION, OF NEW YORK, N. Y., A CORPORATION OF MASSACHUSETTS

APPARATUS FOR PRODUCING LAMINATED SHEETS

Application filed March 26, 1930. Serial No. 438,939.

This invention relates to improvements in the production of laminated sheets of fibrous materials, and has particular reference to a method and apparatus for making such sheets.

It has been known to make laminated sheets in which slivers or webs of silk or ramie fibres are interposed between layers of regenerated cellulose to produce a material which may be cut into narrow strips for use as braid for the manufacture of hats and other specialties in the millinery trade and for other purposes, such as the making of artificial flowers. In the production of such material, it is essential that the same be made waterproof in order to accomplish the dyeing thereof, as otherwise the constituent parts of the product would separate when subjected to boiling temperatures. As far as known, this waterproofing operation has been accomplished after the lamination of the various webs of material, thus necessitating additional operations such as the saturating and subsequent drying of the laminated sheet.

According to the present invention, the known method of making laminated sheets, such as above referred to, is improved upon by the application of a suitable waterproofing composition to the fibrous materials before the same are laminated, thus eliminating the steps of saturating and drying the sheet which add considerably to the ultimate cost of production. It is further proposed to decorate sheets made in accordance with the invention by introducing between the webs of materials constituting said sheets, before lamination thereof, a layer of confetti made of paper or the like and which may be in various sizes and shapes and vari-colored.

The invention contemplates the production of a sheet of any desired width in which a sliver or web of fibrous material, such as rayon staple fibres, silk, ramie, or the like, has applied thereto an adhesive and a waterproofing composition, and thereafter is attached to a single web of cellulose material to form the laminated sheet, or secured, as an intermediate layer, between two cellulose strips, or, as a third possibility, attached to a backing of an opaque fibrous material such as paper, cloth, or the like, with a covering of cellulose material for the sliver, if desired. In the latter instance, the finished product may be employed as a wall covering, a hanging such as is used for draperies, or as a covering for confection boxes and the like. When the fibrous sliver and either one or two sheets of cellulose are used in making the product, the finished sheet, which is then translucent, may be utilized in the manufacture of lamp-shades, or may be cut into thin ribbons or strips for use as a braid in making hats, and in producing artificial flowers, as previously stated. The product is susceptible of various other uses and, in any instance, any one or all of the layers of material may be dyed or not before lamination, or the dyeing operation may be accomplished on the finished product. In either case, innumerable decorative designs may be effected.

The invention further contemplates an apparatus to be used, in conjunction with the means for laminating the layers of materials, for cutting from any suitable material, such as paper, cellulose sheets or threads, small pieces of various sizes and shapes in the nature of confetti which, after the cutting operation, are fed upon the sliver of fibrous material prior to its adhesion to the other layer or layers constituting the laminated sheet.

The inventive idea involved is capable of receiving a variety of expressions, some of which, for purposes of illustration, are shown in the accompanying drawings, wherein:—

Figure 1 is a side elevation, partially diagrammatic and in section, of a machine for carrying out the invention;

Figure 2 is a plan view of a punch apparatus employed to cut the confetti from a continuous web or webs of paper;

Figure 3 is a perspective view of the finished product as produced on the machine of Figure 1, the various layers or webs being shown partially separated; and Figure 4 is a fragmentary elevation, showing diagrammatically a textile carding mechanism which may be substituted for the sliver-preparing mechanism, conventionally shown in Figure 1.

The invention is carried out preferably through the instrumentality of a machine such as shown in Figure 1, wherein there is illustrated conventionally, at the left of said figure, a preparing mechanism A of a construction well known in the textile art and adapted for the purpose of forming a plurality of fibres into a sliver 5 by the cooperation of the gills 6 disposed between the feeding and draft rolls 7 and 8, respectively, the latter assisting in the continuous feeding of the sliver through the machine. In the resultant sliver, the multitude of fibres are closely arranged in practically parallel relation and then fed through a guide 9. In the manufacture of the product of the present invention, it is preferable to employ rayon staple fibre for making the sliver, although other fibrous materials may be used without departing from the scope of the invention.

As the sliver 5 emerges from the guide 9 it passes between the gluing rolls 10 and 11, the former of which are partially immersed in a glue and other suitable adhesive contained within the tank 12. Immediately following the application of the adhesive to the sliver, the latter passes under a take-off roll 13 and is then engaged, on one surface, by a roll 14 used to apply a waterproofing composition to the sliver. This composition, which may be formaldehyde, is poured into a tank 15 and has the roll 14 partially immersed therein so as to obtain a constant application of the formaldehyde to the sliver. It has also been found feasible to simultaneously apply the adhesive and waterproofing composition to the sliver by mixing the liquids in the same tank but, preferably, these applications are performed successively.

At this point of the operation, should it be desired to decorate the finished product by the distribution of confetti 16 upon the upper surface of the sliver 5, the mechanism B, later to be described in detail, becomes effective to deposit confetti upon said sliver as it passes over the roll 14. Throughout the description and claim, where reference is made to confetti, the term is to be construed as including pieces of any suitable material, such as vari-colored paper or the like, cut into any shapes and sizes.

The lamination of the sliver 5 with one or more layers or webs of other material or materials is now effected. For this purpose, the sliver is passed between two oppositely driven pressure rolls 17, preferably rubber covered, and is here attached, by the adhesive coating which has at least partially permeated the sliver, to one or more other layers of material or materials. In the present illustration, two such layers 18 and 19 are shown as being fed from the rolls 20 and 21, respectively, and around the rolls 17 on opposite sides of the sliver 5. As above suggested, one of these layers may be omitted and when both are employed they may be of the same or different material. When only one of the layers or webs is used, it may be made of regenerated cellulose, and when two layers are employed they may both be of cellulose, or one of them may be of another fibrous material, such as paper, cloth, or the like.

After being pressed together by the rolls 17, the laminated sheet now passes over a spreader roll 22 which aids in preventing any possible wrinkling of the sheet. From thence, the sheet passes around a series of heated drying cylinders 23 which may be enclosed in a casing (not shown), so as to effectively retain the heat and facilitate drying of the sheet. Upon leaving the last of the cylinders 23, the sheet is guided by a series of rolls 24 on to a final drying roll 25. A roll 26 and tension plate 27 now guide the sheet on to the take-up roll 28, said plate being pivoted at 29 and having a weight 30 suspended from one end thereof to cause the plate to exert a pressure against the sheet as it is wound upon the roll 28. During the passage of the sheet around the drying rolls, the various layers of material become securely attached to each other and the formaldehyde has an opportunity to thoroughly permeate said layers so that the finished product may, if desired, be subjected to a boiling temperature for purposes of dyeing without danger of separation of the component elements of the sheet.

It may be found desirable for certain purposes to produce a sliver in which the fibres thereof do not run exactly parallel, as in the case when the preparing mechanism A is used, but are intermingled with each other and extend both longitudinally and transversely of the sliver. To this end, the mechanism A may be replaced, as conventionally shown in Figure 4, by a textile card C of known construction including the usual duffer roll 31, the duffer 32 and guide 33 which cooperate to partially straighten the fibres of the sliver before it enters between the gluing rolls 10 and 11.

Referring now to the mechanism B employed to form and deposit the confetti 16 on to the sliver, there is shown a bracket 34 adapted to support the mechanism above the sliver 5. Carried by this support is a lower or stationary die 35 over which one or a plurality of webs 36 of vari-colored paper or the like may be guided by rollers 37 on to a waste take-up roll 38 driven from any suitable source. Above the die 35 and cooperating therewith is a vertically reciprocatory die 39 having its stem 40 movable in guides 41. This die 39 is operated by a lever 42 pivoted to one of the guides 41 and having one end connected to a rod 43 operated from an eccentric 44. Thus, as the lever 42 is oscillated, the die 39 is raised and lowered to intermittently cut small pieces of confetti from the web or webs 36. After each cutting operation, the roll 38 is rotated to move the webs 36 to a new position and the confetti falls through the die 35 into a funnel 45 from whence it is directed on to the sliver 5.

What is claimed is:

In an apparatus for producing a laminated sheet, a mechanism for forming a sliver of fibrous material, means to apply an adhesive and a waterproofing composition to said sliver, means to deposit confetti upon a surface of said sliver following the application of the adhesive thereto, and means to attach a layer of another material to said surface.

In testimony whereof I have affixed my signature.

JULIUS WYSS.